United States Patent
Dhaka et al.

(10) Patent No.: US 12,236,173 B2
(45) Date of Patent: Feb. 25, 2025

(54) INFORMATION PROCESSING APPARATUS, AND CONTROL METHOD

(71) Applicant: NEC Corporation, Tokyo (JP)

(72) Inventors: Devendra Dhaka, Tokyo (JP); Masato Ishii, Tokyo (JP); Atsushi Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 869 days.

(21) Appl. No.: 17/413,200

(22) PCT Filed: Dec. 25, 2018

(86) PCT No.: PCT/JP2018/047489
§ 371 (c)(1),
(2) Date: Jun. 11, 2021

(87) PCT Pub. No.: WO2020/136704
PCT Pub. Date: Jul. 2, 2020

(65) Prior Publication Data
US 2022/0058313 A1 Feb. 24, 2022

(51) Int. Cl.
*G06F 30/20* (2020.01)
*G06F 18/2431* (2023.01)
(Continued)

(52) U.S. Cl.
CPC .......... *G06F 30/20* (2020.01); *G06F 18/2431* (2023.01); *G06T 7/20* (2013.01); *G06F 2111/08* (2020.01); *G06T 2207/30241* (2013.01)

(58) Field of Classification Search
None
See application file for complete search history.

(56) References Cited

U.S. PATENT DOCUMENTS 6,826,477 B2 * 11/2004 Ladetto ................ G01C 21/206
    701/472
9,672,427 B2 * 6/2017 Laska ..................... G06F 18/24
(Continued)

FOREIGN PATENT DOCUMENTS

| JP | 2009-066692 A | 4/2009 |
| JP | 2011-054088 A | 3/2011 |
| JP | 2018-152056 A | 9/2018 |

OTHER PUBLICATIONS

Yuthika Punchihewa, Multiple Object Tracking in Unknown Backgrounds With Labeled Random Finite Sets, Apr. 3, 2018 (Year: 2018).*
(Continued)

*Primary Examiner* — Juan C Ochoa
*Assistant Examiner* — Michael Paul Mirabito

(57) ABSTRACT

The information processing apparatus (2000) of the example embodiment 1 includes an acquisition unit (2020), a modeling unit (2040), an output unit (2080). The acquisition unit (2020) acquires a plurality of trajectory data. The trajectory data represents a time-sequence of observed positions of an object. The modeling unit (2040) assigns one of groups for each trajectory data. The modeling unit (2040) generates a generative model for each group. The generative model represents trajectories assigned to the corresponding group by a common time-sequence of velocity transformations. The velocity transformation represents a transformation of velocity of the object from a previous time frame, and is represented using a set of motion primitives defined in common for all groups. The output unit (2060) outputs the generated generative models.

7 Claims, 6 Drawing Sheets

(51) Int. Cl.
  *G06F 111/08* (2020.01)
  *G06T 7/20* (2017.01)

(56) References Cited

U.S. PATENT DOCUMENTS

2002/0176604 A1* 11/2002 Shekhar ............... G06T 7/246
                                                            382/104
2018/0231974 A1   8/2018  Eggert et al.
2018/0372499 A1* 12/2018  Ali ..................... G06T 7/248

OTHER PUBLICATIONS

Matteo Zanotto, Online Bayesian Non-Parametrics for Group Detection, Jan. 2012 (Year: 2012).*

JP Office Action for JP Application No. 2021-531749, mailed on Nov. 29, 2022 with English Translation.

International Search Report for PCT Application No. PCT/JP2018/047489, mailed on Mar. 12, 2019.

Wang, Xiaogang, et al., "Trajectory Analysis and Semantic Region Modeling using Nonparametric Hierarchical Bayesian Models", International Journal of Computer Vision 2011, pp. 1-34.

Kooij Julian FP et al., "A Nonparametric Hierarchical Model to Discover Behaviour Dynamics from Tracks", European Conference on Computer Vision 2012, pp. 270-283, Part VI, LNCS 7577, Springer-Verlag Berlin Heidelberg 2012.

Dhaka, Devendra et al., "Latent Linear Dynamics for Modeling Pedestrian Behaviors", 24th International Conference on Pattern Recognition (ICPR), Beijing, China, Aug. 20-24, 2018, pp. 1592-1597, ISSN 1051-4651, IEEE.

Inomata, Teppei et al., "Suspicious Behavior Detection System for an Open Space Parking Based on Recognition of Human Elemental Actions", IEEJ Transactions on Electronics, Information and Systems, Feb. 1, 2010, pp. 302-309, vol. 130, No. 2, ISSN 0385-4221.

* cited by examiner

INFORMATION PROCESSING APPARATUS, AND CONTROL METHOD

This application is a National Stage Entry of PCT/JP2018/047489 filed on Dec. 25, 2018, the contents of all of which are incorporated herein by reference, in their entirety.

TECHNICAL FIELD

Embodiments of the invention generally relate to the field of video analysis.

BACKGROUND ART

With the recent advances in the field of machine learning and growing demands and adoption of surveillance systems at public places e.g. airports, train stations and/or any crowded place, requests for generic models which are capable of discovering anomalous patterns in the crowd behaviors effectively without any theoretical limitation. Developing such general and robust behavior model is intrinsically associated with discovering behavior specific latent generative features that are invariant under scene and/or camera change. A model which learns camera and/or scene invariant motion primitives, can adapt to a different scene or different camera setting, without any calibration or training data required.

In general, the behavior recognitions task can be carried out majorly in two phases, training phase and test phase. During training phase, we perform generative modeling of input trajectories of objects e.g. people, in terms of latent generative model variables, both global and local variables. These variables can be thought as random variables of any Bayesian model, and represent scene and camera invariant features. Once training phase is done, learnt global variables are fed into test phase, which evaluates the likelihood of test trajectories. Trajectories with higher likelihood are composed of normal behaviors and consent with majority of the input trajectories, and on contrary, lower likelihood indicates a trajectory to be anomalous. As principle, all suspicious behaviors are anomalous behaviors, but reverse doesn't hold true, additionally all the normal behaviors are thought as non-suspicious behaviors. Thus categorizing the behaviors into a sub-category really reduces efforts over analysis of trajectories by hand.

Below we denote prior arts for behavior modeling, as NPL 1 and NPL 2 respectively. Both and proposed innovation discover latent features over observed real world scene and model each individual trajectory. Every input trajectory is associated to its own 'group', all the trajectories within a group have similar behavior over real world space, and have group specific generative variables, that define their similar behavior.

RELATED DOCUMENT

Non-Patent Document

[NPL 1] Wang, Xiaogang, et al., "Trajectory Analysis and Semantic Region Modeling using Nonparametric Hierarchical Bayesian Models", International Journal of Computer Vision 2011

[NPL 2] Kooij Julian F P et al., "A Nonparametric Hierarchical Model to Discover Behaviour Dynamics from Tracks", European Conference on Computer Vision 2012

SUMMARY OF INVENTION

Technical Problem

Both NPL 1 and NPL 2 model trajectories under the assumption that scene and camera type are known in advance. Thus, they cannot handle test trajectories that come from unknown scene or camera type.

The objective of the present invention lies in providing a novel modelling strategy for behaviour recognition, that is capable of making trajectory model by which test trajectories that come from unknown scene and camera type can be handled.

Solution to Problem

The present invention provides the first information processing apparatus comprising: 1) an acquisition unit acquires a plurality of trajectory data, wherein the trajectory data represents a time-sequence of observed positions of an object, 2) a modeling unit assigning a group for each trajectory data and generating a generative model for each group, wherein the generative model represents trajectories assigned to the corresponding group by a common time-sequence of velocity transformations, the velocity transformation represents a transformation of velocity of the object from a previous time frame, and is represented using a set of motion primitives defined in common for all groups; and 3) an output unit outputting the generated generative models.

The present invention provides the second information processing apparatus comprising: 1) an acquisition unit acquiring a trajectory data and a plurality of generative models, wherein the trajectory data represents a time-sequence of observed positions of an object, the generative model represents trajectories assigned to a group corresponding to that generative model by a common time-sequence of velocity transformations, the velocity transformation represents a transformation of velocity of the object from a previous time frame, and is represented using a set of motion primitives defined in common for all groups; 2) a likelihood computation unit computing, for each group, likelihood that the acquired trajectory data belongs to that group, and computing total likelihood based on the computed likelihoods; and 3) a determination unit determines that the trajectory data represents an abnormal behavior when the total likelihood is less than a pre-set threshold.

The present invention provides a computer program that executes each step of the method provided.

Advantageous Effects of Invention

The present invention achieves to provide a novel modelling strategy for behaviour recognition, that is capable of making trajectory model by which test trajectories that come from unknown scene and camera type can be handled.

BRIEF DESCRIPTION OF DRAWINGS

Aforementioned objects, procedure and technique for behavior modeling will be made comprehensible via selected example embodiments, described below, and the aided drawings.

DESCRIPTION OF EMBODIMENTS

Example Embodiment 1

<Overview>

The information processing apparatus 2000 of example embodiment 1, takes in multiple input trajectories from training data, assigns clusters (groups) for each based on motion primitives and velocity modeling, and thus generates a generative model for each group so that the generative model represents trajectories belonging to the corresponding group. Equivalently, the information processing apparatus 2000 of the example embodiment 1 performs a training phase in behavior recognition task.

The input training data comprises tracked trajectories, which can be from different scenes and/or taken with different cameras calibration points over same scene. The input trajectory represents a time-sequence of observed position of an object in real world coordinates, thereby denoting the path taken by that object, and thus representing the behavior of that object.

Groups of the trajectories are generated so that, for trajectories belonging to that group, the likelihood of the trajectory data as whole has significantly high likelihood. As mentioned in detail later, such groups can be generated through Dirichlet Process, very common in Bayesian non-parametrics.

The generative model of each group represents a time-sequence of each input trajectory data belonging to that group, based on a time-sequence of velocity transformations common in that group. Velocity transformation represents change in velocity of the object from the previous time frame to the current time frame, using on a set of motion primitives named action set. Examples of the action sets are "forward", "backward", "left", and "right". Since action sets are defined in a scene and camera parameter invariant manner as described in detail later, the generative model of the present invention can represent the behavior of the objects belonging to the same group in a scene and camera parameter invariant manner.

Advantageous Effects

The present invention provides a novel way for behavior recognition and simultaneously discovering the latent motion primitive variables that are invariant under scene change or camera change. Learning such invariant motion determining variables, one doesn't require training data for every scene and every camera setting present in the test case dataset. Thus, present invention alleviates the problem of acquiring training data every time a new type of test dataset arrives, more specific present invention provides generic behavior recognition algorithm the performance of which is invariant under camera and scene changes.

Hereinafter, more detail explanation of the information processing apparatus 2000 will be described.

<Example of Function-Based Configuration>

Figure 1:
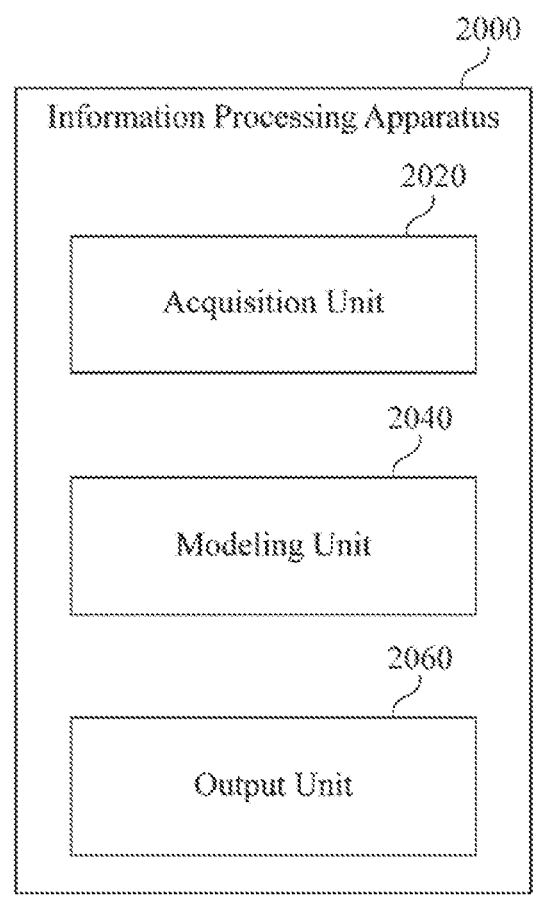
FIG. 1 illustrates an example diagram of a function-based configuration of the information processing apparatus of the example embodiment 1.

FIG. 1 illustrates an example diagram of a function-based configuration of the information processing apparatus 2000 of the example embodiment 1. The information processing apparatus 2000 of the example embodiment 1 includes an acquisition unit 2020, a modeling unit 2040, and an output unit 2060. The acquisition unit 2020 acquires a plurality of trajectory data. The modeling unit 2040 assigns one of groups for each trajectory data. In addition, the modeling unit 2060 generates the generative model for each group. The output unit 2060 outputs the generated generative models.

<Example of Hardware Configuration>

In some embodiments, each functional unit included in the information processing apparatus 2000 may be implemented with at least one hardware component, and each hardware component may realize one or more of the functional units. In some embodiments, each functional unit may be implemented with at least one software component. In some embodiments, each functional unit may be implemented with a combination of hardware components and software components.

The information processing apparatus 2000 may be implemented with a special purpose computer manufactured for implementing the information processing apparatus 2000, or may be implemented with a commodity computer like a personal computer (PC), a server machine, or a mobile device. In addition, the information processing apparatus 2000 may be implemented with a camera that captures video frames with which each trajectory data is generated. As a camera with which the information processing apparatus is implemented, so-called IP (Internet Protocol) camera, network camera, or intelligent camera may be used.

Figure 2:
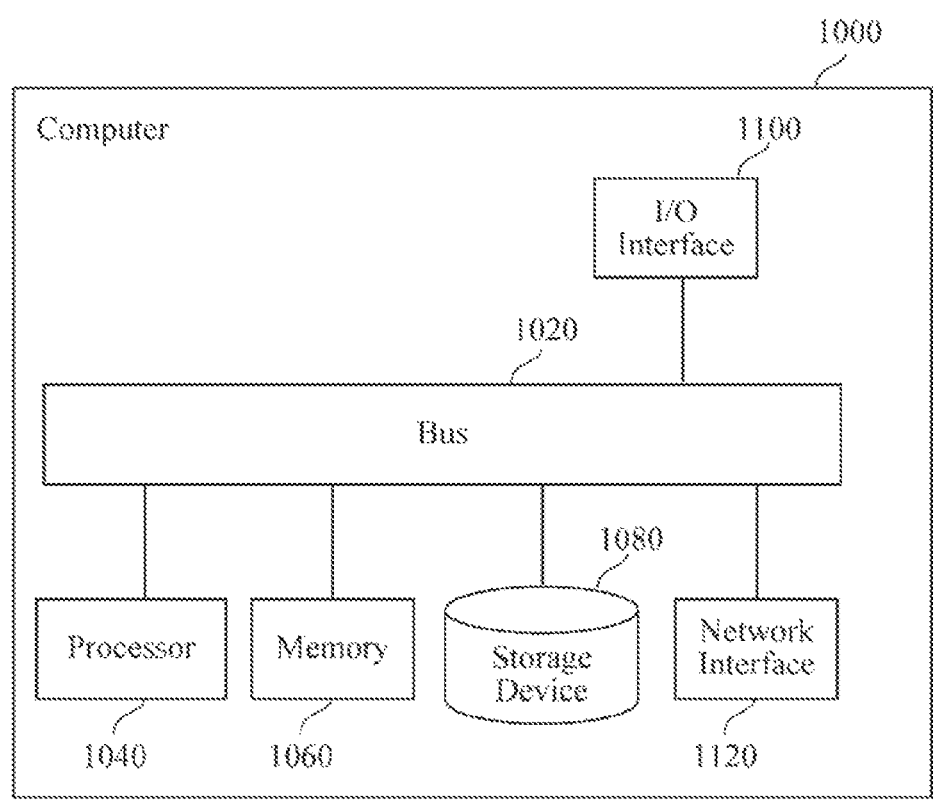
FIG. 2 is a block diagram illustrating an example of hardware configuration of a computer realizing the information processing apparatus of the example embodiment 1.

FIG. 2 is a block diagram illustrating an example of hardware configuration of a computer 1000 realizing the information processing apparatus 2000 of the example embodiment 1. In FIG. 2, the computer 1000 includes a bus 1020, a processor 1040, a memory 1060, a storage device 1080, an input-output (I/O) interface 1100, and a network interface 1120.

The bus 1020 is a data transmission channel in order for the processor 1040, the memory 1060 and the storage device 1080 to mutually transmit and receive data. The processor 1040 is a processor such as CPU (Central Processing Unit), GPU (Graphics Processing Unit), or FPGA (Field-Programmable Gate Array). The memory 1060 is a primary storage device such as RAM (Random Access Memory). The storage medium 1080 is a secondary storage device such as hard disk drive, SSD (Solid State Drive), or ROM (Read Only Memory).

The I/O interface is an interface between the computer 1000 and peripheral devices, such as keyboard, mouse, or display device. The network interface is an interface between the computer 1000 and a communication line through which the computer 1000 communicates with another computer.

The storage device 1080 may store program modules, each of which is an implementation of a functional unit of the information processing apparatus 2000 (See FIG. 1). The CPU 1040 executes each program module, and thereby realizing each functional unit of the information processing apparatus 2000.

<Flow of Process>

Figure 3:
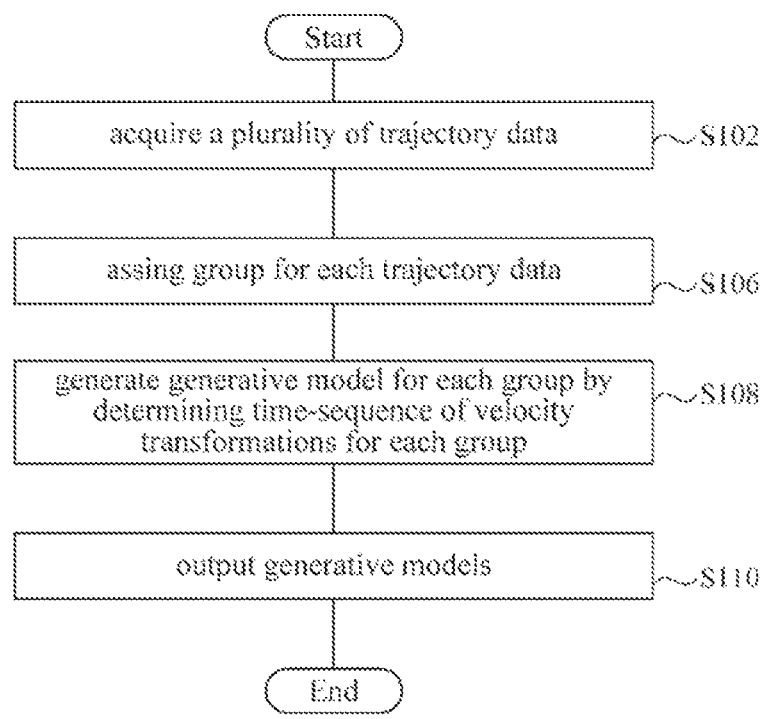
FIG. 3 is a flowchart illustrating a flow of processes performed by the information processing apparatus of the example embodiment 1.

FIG. 3 is a flowchart that illustrates the process sequence performed by the information processing apparatus 2000 of the example embodiment 1. The acquisition unit 2020 acquires a plurality of the input trajectory data (S102). The modeling unit 2040 assigns a group for each trajectory data (S106). The modeling unit 2060 generates a generative model for each group by determining a time-sequence of velocity transformations for each group (S106). The output unit 2060 outputs the generative models (S108).

<Trajectory Data>

As mentioned before, the input data is collection of trajectories, as individual are time sequence of observed positions of object in video. The video may describe any general scene e.g. captured by surveillance in a public place, motion of pedestrians in street or movement of locomotives over roads. Object in this invention may be any kind of objects the position of which is possible to changes: person, animal, vehicle, and so on. The observed position used in this invention is described as the position of object in the real world coordinates, computed using its location in video image frame. Note that, there are already many state of the art techniques for obtaining the time sequence of an object in video and computing the real world position of that object.

<Motion Primitives>

This section defines a set of motion primitives handled by the information processing apparatus 2000, which is named action set. As described above, action set is used to represent velocity transformation.

In general the properties of action set determine the generalization ability of the overhead algorithm. In this invention, we propose the following definition of action set, and later discuss their properties and their generalization roles Definition: Action Set An exhaustive and minimal set of time and location independent transformations, which can span the entire dynamics of velocity variable.

We denote the action set of size M as:

Equation 1

$$A := \{a_i\} \text{ for } i = 1,2,3, \ldots M \quad (1)$$

An action lying in this set describes a velocity transformation in the previous frame to the current frame, for example:

Equation 2

$$v_t = f_i(v_{t-1}) := T(v_{t-1} | a_i) \quad (2)$$

Below we discuss one such action set which is consistent with the definition and its properties and generalization ability. Take M=4, we define a camera and scene invariant action set as follows:

Equation 3

$$a_1: \text{left } v_t = v_{t-1} + \beta v_{t-1}^\perp, \beta > 0$$

$$a_2: \text{right } v_t = v_{t-1} + \beta v_{t-1}^\perp, \beta > 0$$

$$a_3: \text{forward } v_t = v_{t-1}$$

$$a_4: \text{backward } v_t = -v_{t-1} \quad (3)$$

Note that, these velocity transformations are location and time independent and cover all possibilities, i.e. taking a left/right/forward/backward.

The action set described above has following key properties

1. Since proposed action set is location and time independent, the velocity transformation turns out to be relative to individual velocity thus this is scene and camera invariant i.e. a similar behavior under two scenes can be decomposed by same set of actions.

2. The following action set, can be merely represented by single parameter $\beta$, in case of forward and backward, this parameter takes zero value. The other two actions can be shown to have common representation as below, where positive values of parameter $\beta$ denote a left turn while negative values denote a right turn.

Equation 4

$$v_t = v_{t-1} + \beta v_{t-1}^\perp \quad (4)$$

3. The actual magnitude of parameter $\beta$ controls the curvature of velocity profile, given just the parameter $\beta$ and velocity at previous frame, we can evaluate the velocity in current frame.

<Modeling>

The modeling unit 2040 assigns a group for each input trajectory data, and generates a generative model for each group. Before setting up an example algorithm of modeling, we introduce general notations that will be used for further explanation.

The trajectory data for the object i, where i is an identifier of the object, is denoted as Xi. The trajectory data Xi includes $\{x_{it} | 0 <= t < n\}$, where t is a time frame number and n is the number of positions in the trajectory data Xi.

The latent position distribution of the object i at time frame t is denoted by zit. The latent position distribution represents a probability distribution of a true position of the object i at the time frame t that is inferred based on the observed position of the object i. In other words, the observed positions included in the trajectory data are handled as including some noise. The relationship between zit and xit may be formulated as follows:

Equation 5

$$z_{i,t} = x_{i,t} - n_{i,t} \Lambda \quad (5)$$

where nit represents a noise included in the observed position xit.

The noise nit is a random sample from a probability distribution of noise. Therefore, the latent position distribution zit is also a random sample from a probability distribution, i.e. latent position distribution. The noise nit may be estimated with a variety of well-known techniques. For example, the noise is assumed to be a random sample from a Gaussian distribution with some predefined variance. Note that, it is preferable that the noise for any time frame is independent of rest of the time frames and depends only on the current time (e.g. white noise).

A time-sequence of the latent position distribution zit may be formulated as an auto regressive with finite degree q, i.e. AR(q) model; the latent position distribution at each time frame depends on its previous q states and control term through a linear relationship. For q=1, the time-sequence of the latent position distribution zit can be described as follows:

Equation 6

$$z_{i,t} = a_i z_{i,t-1} + v_{i,t} \Lambda \quad (6)$$

In above equation, ai is an auto-regressive coefficient for the trajectory data i. In some embodiments, ai for each trajectory data i is assumed to be a random sample from Gaussian distribution with some predefined variance. However one is allowed to choose any kind of distribution for this coefficient. For example, ai can be simply assumed to be 1 for each trajectory data.

The control term vit is an estimated velocity of the object i at the time frame t. Using the representative velocity rjt, which is the representative velocity of the group j at the time frame t to which the trajectory data i is classified into, the estimated velocity vit can be described as follows:

Equation 7

$$v_{i,t}=r_{j,t}+n_2 \qquad (7)$$

where n2 is denoted as noise term. Note that velocity of an individual i can be seen a noisy sample from a distribution which has mean rj,t the velocity of group j at time frame t.

For group j, the dynamics or the representative velocity in the time frame t is formulated using the action set described above. Let A:={ai} for i=1,2, . . . , M be the action set, consistent with definition, at time t and given an action alt we have following transformation:

Equation 8

$$r_{j,t}=f_j(r_{j,t-1}):=T(r_{j,t-1}|a_{l,t}) \qquad (8)$$

We additionally assume that transformations are defined such that, their parameters can be recovered given just rj,t and rj,t−1 For the example case, this turns out to be recovering the parameter β for frame t and group j. This further results in time sequence of parameter p over time, and for each group, this step is described as S108.

<Example Modeling Algorithm>

Figure 4:
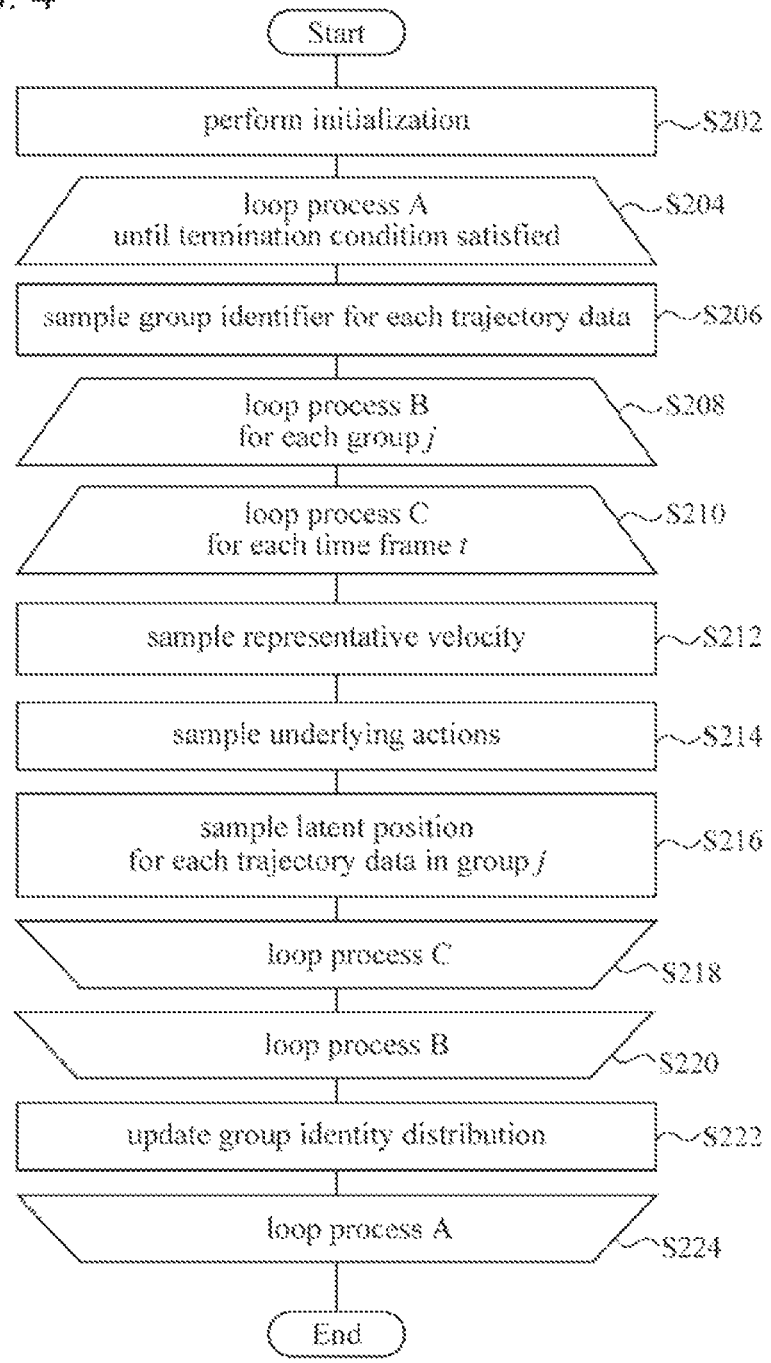
FIG. 4 illustrates an example algorithm of modeling performed by the information processing apparatus 2000.

An example algorithm of modelling will be demonstrated, consistent with the above mentioned notations. Modelling in this invention includes: 1) making groups and 2) estimating parameters for each groups' generative model. FIG. 4 illustrates an example algorithm of modeling performed by the information processing apparatus 2000. Briefly, the information processing apparatus 2000 in FIG. 4 performs Gibbs sampling in order to make groups and estimate parameters of generative models.

The modeling unit 2040 performs an initialization process (S202). In the initialization process, the modeling unit 2040 initializes all the trajectories to a single group. In other words, all the trajectories are initialized to belong to the same group.

Once all the trajectories are assigned to single cluster, the modeling unit 2040 performs the loop process A, until a preset termination condition is met. Except first iteration, in step S206, the modeling unit samples group association term for each trajectory data from the group identifier distribution evaluated for each trajectory. This is equivalent to categorizing each trajectory into clusters having similar transformation patterns in velocities. The details of group identifier distribution and methods of evaluating it will be described later. As it will be seen later, the group identifier distribution is a probability assignment of choosing that particular group, over existing group and one additional new group at every iteration of loop process A. During sampling the group identity if a trajectory is assigned to new group, the trajectory is classified into this new group. This process of sampling group identity is related to Dirichlet process, very common in Bayesian non-parametrics.

Given the cluster assignments from step S206 for all the trajectories in the dataset, the modeling unit 2040 performs loop process B for each identified group. For each group j, the modeling unit 2040 performs loop process C for each time frame. For each group j and time frame t, the modeling unit 2040 samples the sequence of representative velocity rj,t. The sampling of representative velocity is done by performing marginalization of latent positions and set of actions, for all the trajectories belonging to group j.

Once the representative velocity is sampled, the modeling unit 2040 samples the latent position zi for each trajectory i in the group j. The time-sequence of latent positions can be sampled using ubiquitous and widely applicable Kalman filtering approach.

Once sampled representative velocity of each group j is obtained, the time sequence of set of actions is sampled from this sampled representative velocity. Post determining the set of actions, we can evaluate the parameter β for each group j and time frame t.

For each trajectory in the dataset, the modeling unit 2040 further updates the group identifier distribution. Lets denote the probability of assigning trajectory i to group j by Pr(i,j), applying Bayes rule this turns out to be:

Equation 9

$$Pr(i,j)=Pr(x_i|g_i=j)*Pr(j) \qquad (9)$$

Note that, Pr(j) represents the probability of picking up group j, gi represents a group identifier to which the trajectory data i belongs, and Pr(xi|gi=j) represents likelihood of trajectory data i if its parameters were determined by group data j.

The probability of picking up group j is determined according to Dirichlet process. We use well studied Chinese restaurant process for assignment of the probabilities to atoms or groups in this case, this is as follows:

Equation 10

$$\frac{N_j}{\alpha+N-1} \text{ for group } j \text{ to which} \qquad (10)$$

trajectory data i does not currently belongs $$\frac{N_j-1}{\alpha+N-1} \text{ for group } j \text{ to which trajectory}$$

data i currently belongs $$\frac{\alpha}{\alpha+N-1} \text{ for new group}$$

where α is a hyper parameter (i.e. predetermined value, such as 1), Nj is the number of trajectory data belonging to the group j, and N is the total number of the trajectory data.

Computation of likelihood of a trajectory data i to belong to group j can be computed by performing marginalization over latent positions and imputing the sampled representative velocities of group j. This step is similar to most of the Kalman filtering steps, where one obtains the likelihood of a sequence given the model parameters.

Example Embodiment 2

<Overview>

The information processing apparatus 2100 of the example embodiment 2 acquires a test trajectory data and a plurality of generative models, and performs the task of classifying the test trajectory, whether the test trajectory describes a normal behavior or an abnormal behavior. In other words, the information processing apparatus 2100 of the example embodiment performs a test phase in behavior recognition. Or equivalently, the information processing apparatus 2100, determines whether the test trajectory can be represented by one of the acquired generative models well. If there is any generative model that represents the test trajectory well, the information processing apparatus 2100 describes the behavior corresponding to the test trajectory as normal behavior. On the other hand, if there is no generative model that represents the test trajectory data well, the information processing apparatus 2100 determines that the test trajectory data shows an abnormal behavior.

Given the generative model, the information processing apparatus 2100 of this example embodiment evaluates the likelihood of the test trajectory. The information processing apparatus 2100 determines that the test trajectory corresponds to normal behavior, if its evaluated likelihood is substantially high i.e. higher than a preset threshold. On the other hand, if the test trajectories have lower evaluated likelihood, it is categorized as abnormally behaving trajectory. In general, if there is any generative model that can represent a trajectory well, the evaluated likelihood of the trajectory will be high, thus abnormal trajectory corresponds a trajectory that can't be represented by any of the available generative model.

Note that, the information processing apparatus 2100 may acquire a plurality of test trajectories. In this case, each test trajectory is individually examined by the information processing apparatus 2100.

Figure 5:
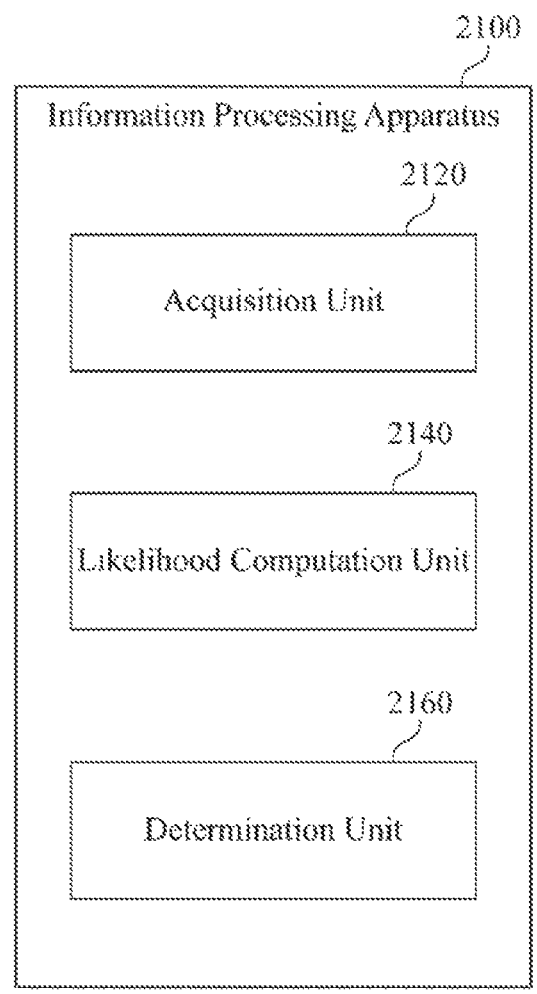
FIG. 5 is a block diagram illustrating an example of function-based configuration of the information processing apparatus 2100.

FIG. 5 is a block diagram illustrating an example of function-based configuration of the information processing apparatus 2100. The information processing apparatus 2100 of the present embodiment consists an acquisition unit 2120, likelihood computation unit 2140, and determination unit 2160. The acquisition unit 2120 acquires the test trajectory data and the generative model. The likelihood computation unit 2140 computes, for each group, likelihood that the test trajectory data belongs to that group, and computes total likelihood based on the computed likelihoods. The determination unit 2160 determines whether the test trajectory data represents a normal behavior or an abnormal behavior. Specifically, the determination unit 2160 determines that the test trajectory data represents an abnormal behavior when the total likelihood is less than a pre-set threshold. On the other hand, the determination unit 2160 determines that the test trajectory data represents a normal behavior when the total likelihood is greater than or equal to a pre-set threshold.

In more detail, for each determined group in the generative model and each trajectory in the test dataset, the likelihood computation unit 2140 performs: 1) given the time sequence of action parameter $\beta$, it first models the representative velocity corresponding to the group for that trajectory, note that it may be different from model representative velocity available in the generative model; 2) given the action parameter and evaluated representative velocity for the group, it then generates the distribution over positions for each trajectory; and 3) computation of the likelihood when the test trajectory is represented by group representative variable $\beta$ available in the generative model.

The determination unit 2160 determines if the test trajectory describes a normal behavior, when total likelihood of the generated trajectory is substantially high. On the other hand, the determination unit 2160 determines that the test trajectory data represents an abnormal behavior if total likelihood determined is substantially low.

Advantageous Effect

The information processing apparatus 2100 of this example embodiment determines the likelihood based classification of normal and abnormal behaviors. The acquisition unit however can accept data from any camera and scene which may be significantly different than in the training data. For example, the training dataset may just contain trajectories from station entrances and exits of station XX and YY, however test dataset also contains trajectory data coming from station ZZ. In other words, this example embodiment generalizes the behavior recognition task to unseen datasets. In conventional setting, one needs to collect enough training dataset from each location, this example embodiment circumvents that limitation. Note that since likelihood computation unit 2140 just requires parameter sequence $\beta$, thus the trajectories having similar $\beta$ sequence in the test dataset will be classified as normal behaviors, on the other extreme if the trajectories can't be represented well through parameter $\beta$, the trajectory will be described as abnormal behavior.

<Hardware Configuration>

The hardware configuration of the information processing apparatus 2100 of the present example embodiment may be illustrated by FIG. 2, similarly to the information processing apparatus 2000 of the example embodiment 1. However, the storage device 1080 may store program modules with which each function unit of the present example embodiment is implemented.

<Flow of Processes>

Figure 6:
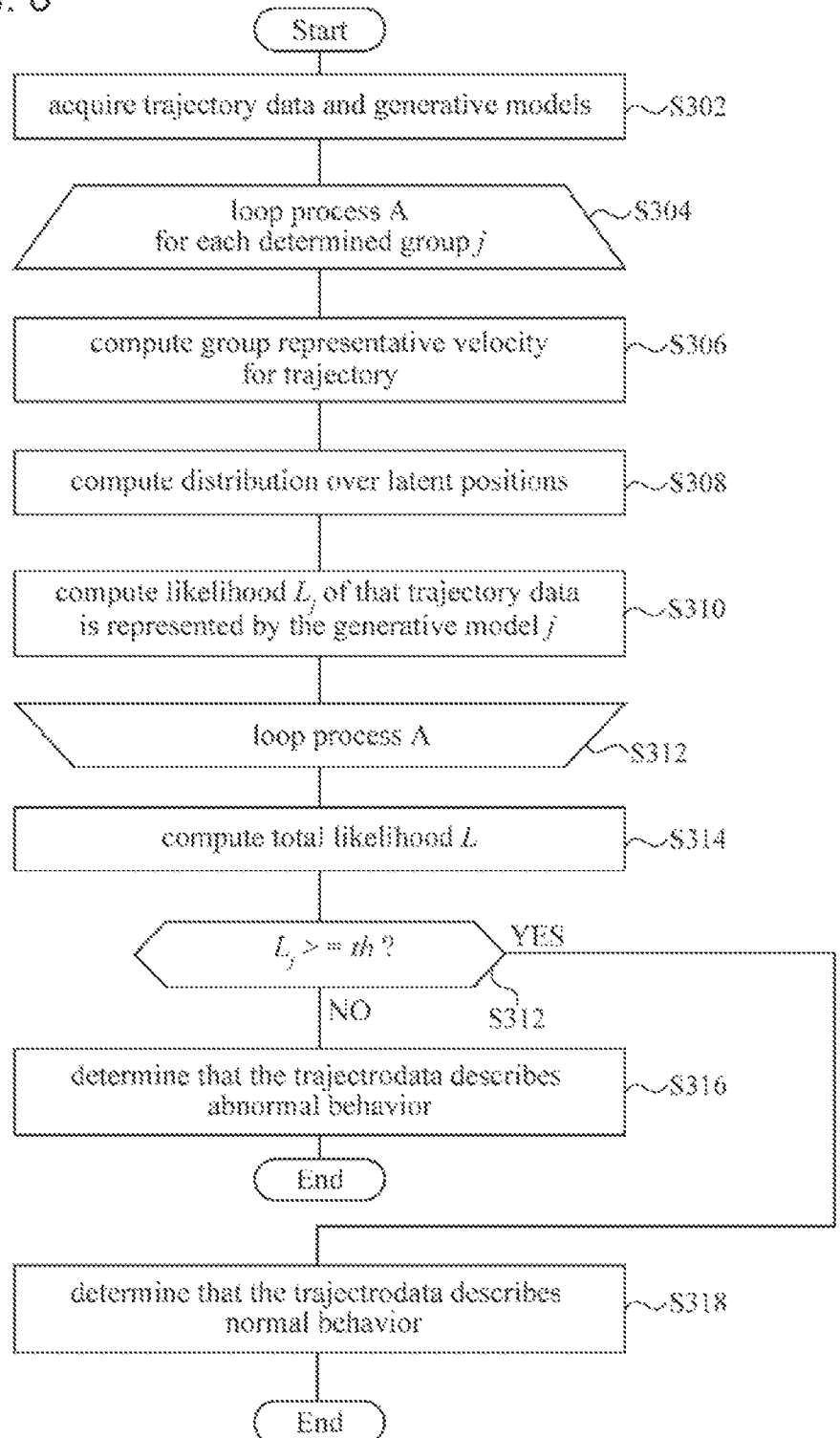
FIG. 6 is a flowchart illustrating a flowchart of the processes performed by the information processing apparatus 2100 of the example embodiment 2.

FIG. 6 is a flowchart illustrating a flowchart of the processes performed by the information processing apparatus 2100 under current example embodiment. The acquisition unit 2120 acquires single trajectory data and generative models (S302). The process can be repeated over input trajectories, in case multiple trajectories are acquired.

For loop process A in example embodiment 2, the steps S304 to 312 are performed for each predetermined groups. In step S304, a single group denoted by j is chosen, for which likelihood computation unit 2140 computes the likelihood of trajectory if it was represented by generative model corresponding to group j.

The likelihood computation unit 2140 computes the time sequence of representative velocity for input trajectory (S306), if its model variable $\beta$ corresponds to group j. The likelihood computation unit 2140 then computes predictive posterior distribution over latent positions that correspond to the input trajectory (S308). Using predictive posterior and the input trajectory data, the likelihood $L_j$, likelihood of input trajectory being generated by model parameters of group j, are computed (S310). The loop process A is repeated over all the groups that are predetermined in input generative model. The computation of posterior predictive distribution can be done using message passing approach, which is closely related to Kalman filtering steps for state space models.

The likelihood computation unit 2140 computes the total likelihood for input trajectory, the total likelihood represents the probability with which following trajectory has been generated (S314). The total likelihood is given by:

Equation 11

$$L = (\text{Probability of observing group } j) * L_j \qquad (11)$$

Probability of observing group j, is exactly same as set of equations 10.

Once likelihood computation unit 2140 has computed total likelihood for input trajectory, the total likelihood is compared against preset threshold value (S312), as part of likelihood calculation unit 2140. The determination unit 2160 determined the input trajectory normal, if its total likelihood falls above preset threshold (S318), on contrary, it determines abnormal behavior if the total likelihood is less than the threshold value (S316).

<Acquisition of Trajectory Data>

The acquisition unit 2120 in the information processing apparatus 2100 acquires the input test trajectory data in the same manner as the acquisition unit 2020 acquires the trajectory data.

<Acquisition of Generative Model>

The generative model for the purpose of testing phase in behavior recognition is acquired in step S302. There exist a variety of ways to acquire the generative model, similar to those of acquiring the trajectory data. The generative model here may refer to anyone of these, the data generated by modeling unit 2040 of the example embodiment 1, in this case the generative model is generated within the system. Secondly, the generative model can also be acquired by external storage case, which stores the learnt generative model. In both the above situations, the generative model is acquired in a similar manner.

<Computation of Likelihood>

The likelihood computation unit 2140 of the information processing apparatus 2100 computes the likelihood for input trajectory to belong to one of the predetermined groups present inside the acquired generative model (S302). Given generative model for group j, for every test trajectory i and for each time frame t, the posterior predictive distribution is obtained for each latent position zit, this can be done via employing Kalman filter approach. Once the posterior predictive distribution for each time frame is obtained, the actual probabilities are computed by imputing actually observed trajectory position. The product of these probabilities is taken over all the time frames to obtain likelihood $L_j$.

As described above, although the example embodiments of the present invention have been set forth with reference to the accompanying drawings, these example embodiments are merely illustrative of the present invention, and a combination of the above example embodiments and various configurations other than those in the above-mentioned example embodiments can also be adopted.

What is claimed is:

1. An information processing apparatus comprising:
   at least one memory storing instructions; and
   at least one processor configured to execute the instructions to perform operations comprising:
   acquiring trajectory data representing trajectories of an object as time sequences of observed positions of the object;
   assigning each trajectory to one of a plurality of groups for respectively corresponding behaviors of the object within a real-world space;
   generating a generative model for each group; and
   outputting the generative model generated for each group, wherein
   the generative model for each group represents a common time sequence of transformations of velocity of the object from a previous time frame using a set of motion primitives common to all the groups and using a parameter related to a curvature of a left turn or a right turn of the object,
   the transformations of the velocity of each group are invariant to a scene in which a camera has imaged the object and to a type of the camera,
   the generative model further represents a time sequence of representative velocities by the common time sequence of the transformations of velocity of the object from the previous time frame, and generating the generative model for each group comprises obtaining the time sequence of the representative velocities by performing marginalization on the trajectories assigned to the group, wherein
   the set of motion primitives include going forward, going backward, going leftward, and going rightward, and
   a relationship indicated by the following equations holds true between $v_t$ and $v_{t-1}$, where $v_t$ and $v_{t-1}$ are velocities in time frames adjacent to each other in order in time series and $\beta$ is a parameter:

left $v_t = v_{t-1} + \beta v_{t-1}^\perp$, $\beta > 0$ right $v_t = v_{t-1} + \beta v_{t-1}^\perp$, $\beta > 0$ forward $v_t = v_{t-1}$ backward $v_t = -v_{t-1}$.

2. The information processing apparatus of claim 1, wherein assignment of each trajectory and generation of the generative model for each group are performed through Gibbs sampling.

3. The information processing apparatus of claim 1, wherein assignment of each trajectory is performed using a Dirichlet process.

4. An information processing apparatus comprising:
   at least one memory storing instructions; and
   at least one processor configured to execute the instructions to perform operations comprising:
   acquiring trajectory data representing trajectories of an object as time sequences and a generative model for each of a plurality of groups for respectively corresponding behaviors of an object within a real-world space, the generative model for each group representing a common time sequence of transformations of velocity of the object from a previous time frame using a set of motion primitives common to all the groups and using a parameter related to a curvature of a left turn or a right turn of the object;
   computing, for each group, a likelihood that the acquired trajectory data belongs to that group;
   computing a total likelihood based on the computed likelihood for each group; and
   determining that the trajectory data represents an abnormal behavior when the total likelihood is less than a preset threshold, wherein
   the transformations of the velocity of each group are invariant to a scene in which a camera has imaged the object and to a type of the camera,
   the generative model further represents a time sequence of representative velocities by the common time sequence of the transformations of velocity of the object from the previous time frame, and
   the generative model for each group is a model generated by obtaining the time sequence of the representative velocities by performing marginalization on trajectories assigned to the group, wherein
   the set of motion primitives include going forward, going backward, going leftward, and going rightward, and
   a relationship indicated by the following equations holds true between $v_t$ and $v_{t-1}$, where $v_t$ and $v_{t-1}$ are velocities in time frames adjacent to each other in order in time series and $\beta$ is a parameter:

left $v_t = v_{t-1} + \beta v_{t-1}^\perp$, $\beta > 0$ right $v_t = v_{t-1} + \beta v_{t-1}^\perp$, $\beta > 0$ forward $v_t = v_{t-1}$ backward $v_t = -v_{t-1}$.

5. A control method performed by a computer and comprising:
acquiring trajectory data representing trajectories of an object as time sequences of observed positions of the object;
assigning each trajectory to one of a plurality of groups for respectively corresponding behaviors of the object within a real-world space;
generating a generative model for each group; and
outputting the generative model generated for each group, wherein
the generative model for each group represents a common time sequence of transformations of velocity of the object from a previous time frame using a set of motion primitives common to all the groups and using a parameter related to a curvature of a left turn or a right turn of the object,
the transformations of the velocity of each group are invariant to a scene in which a camera has imaged the object and to a type of the camera,
the generative model further represents a time sequence of representative velocities by the common time sequence of the transformations of velocity of the object from the previous time frame, and
generating the generative model for each group comprises obtaining the time sequence of the representative velocities by performing marginalization on the trajectories assigned to the group, wherein
the set of motion primitives include going forward, going backward, going leftward, and going rightward, and
a relationship indicated by the following equations holds true between $v_t$ and $v_{t-1}$, where $v_t$ and $v_{t-1}$ are velocities in time frames adjacent to each other in order in time series and $\beta$ is a parameter:

left $v_t = v_{t-1} + \beta v_{t-1}^\perp$, $\beta > 0$ right $v_t = v_{t-1} + \beta v_{t-1}^\perp$, $\beta > 0$ forward $v_t = v_{t-1}$ backward $v_t = -v_{t-1}$.

6. The control method of claim 5, wherein assignment of each trajectory and generation of the generative model for each group are performed through Gibbs sampling.

7. The control method of claim 5, wherein assignment of each trajectory is performed using a Dirichlet process.

* * * * *